(12) United States Patent
Thom et al.

(10) Patent No.: US 9,248,783 B2
(45) Date of Patent: Feb. 2, 2016

(54) STABILIZING CARGO ORGANIZER

(71) Applicant: MacNeil IP LLC, Bolingbrook, IL (US)

(72) Inventors: Allan R. Thom, Clarendon Hills, IL (US); David S. Iverson, Hinsdale, IL (US); David F. MacNeil, Hinsdale, IL (US); Frederick W. Masanek, Jr., Barrington, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 170 days.

(21) Appl. No.: 14/068,782

(22) Filed: Oct. 31, 2013

(65) Prior Publication Data

US 2014/0054345 A1    Feb. 27, 2014

(51) Int. Cl.
*B60R 7/00* (2006.01)
*B60R 7/02* (2006.01)

(52) U.S. Cl.
CPC ........................................ *B60R 7/02* (2013.01)

(58) Field of Classification Search
CPC .................................... B60R 7/02; B60R 7/00
See application file for complete search history.

(56) References Cited

U.S. PATENT DOCUMENTS

| | | | |
|---|---|---|---|
| 4,027,892 A | 6/1977 | Parks | |
| 4,512,503 A | 4/1985 | Gioso | |
| 4,718,584 A | 1/1988 | Schoeny | |
| 4,733,898 A * | 3/1988 | Williams | 296/24.32 |
| 4,824,158 A * | 4/1989 | Peters et al. | 296/37.6 |
| 4,838,745 A | 6/1989 | Haydock | |
| 4,842,460 A | 6/1989 | Schlesch | |
| 4,884,733 A | 12/1989 | Geeves | |
| 4,941,784 A | 7/1990 | Flament | |
| 5,031,769 A | 7/1991 | Shea et al. | |
| 5,161,700 A | 11/1992 | Stannis et al. | |
| 5,167,433 A | 12/1992 | Ryan | |
| 5,205,602 A | 4/1993 | Hoare et al. | |
| 5,392,972 A | 2/1995 | Caruso et al. | |
| 5,469,999 A * | 11/1995 | Phirippidis | 224/542 |
| 5,518,170 A | 5/1996 | Rasmussen | |
| 5,549,428 A | 8/1996 | Yeatts | |
| 5,601,271 A | 2/1997 | Janowski et al. | |
| 5,603,439 A * | 2/1997 | Pineda | 224/403 |
| 5,605,108 A | 2/1997 | Woosley | |
| 5,655,863 A | 8/1997 | Mundt | |
| 5,662,305 A | 9/1997 | Shimamura et al. | |
| 5,819,996 A | 10/1998 | Koons, Jr. | |
| 5,865,580 A | 2/1999 | Lawrence | |
| 5,975,819 A | 11/1999 | Cola | |
| 6,012,885 A | 1/2000 | Taylor et al. | |
| 6,109,847 A | 8/2000 | Patel et al. | |
| 6,244,802 B1 | 6/2001 | Stanesic et al. | |
| 6,564,397 B1 | 5/2003 | Hawley et al. | |
| 6,623,840 B2 | 9/2003 | Hainbach | |
| 6,702,532 B1 | 3/2004 | Throener | |

(Continued)

OTHER PUBLICATIONS

USPTO as International Searching Authority, The International Search Report and the Written Opinion of the International Searching Authority, issued in connection with Patent Application No. PCT/US14/44524 on Oct. 24, 2014.

*Primary Examiner* — Brian D Nash
(74) *Attorney, Agent, or Firm* — Perkins IP Law Group LLC; Jefferson Perkins

(57) ABSTRACT

Cargo organizers may be used for various sized boxes and packages. A friction pad overmolded on a bottom panel of the organizer body prevents movement when the cargo is transported in a vehicle.

18 Claims, 6 Drawing Sheets

(56) References Cited

U.S. PATENT DOCUMENTS

| | | |
|---|---|---|
| 7,090,275 B2 * | 8/2006 | Pero .................. 296/37.6 |
| 7,306,416 B1 | 12/2007 | Arico |
| 7,419,203 B2 * | 9/2008 | Chandler et al. ........... 296/37.6 |
| 7,636,960 B2 | 12/2009 | Hawley et al. |
| 7,959,390 B2 | 6/2011 | Gorski |
| 8,210,591 B2 * | 7/2012 | Martin .................. 296/37.6 |
| 2013/0095295 A1 | 4/2013 | Masanek, Jr. et al. |
| 2014/0284365 A1 * | 9/2014 | Smith et al. ............... 224/404 |

* cited by examiner

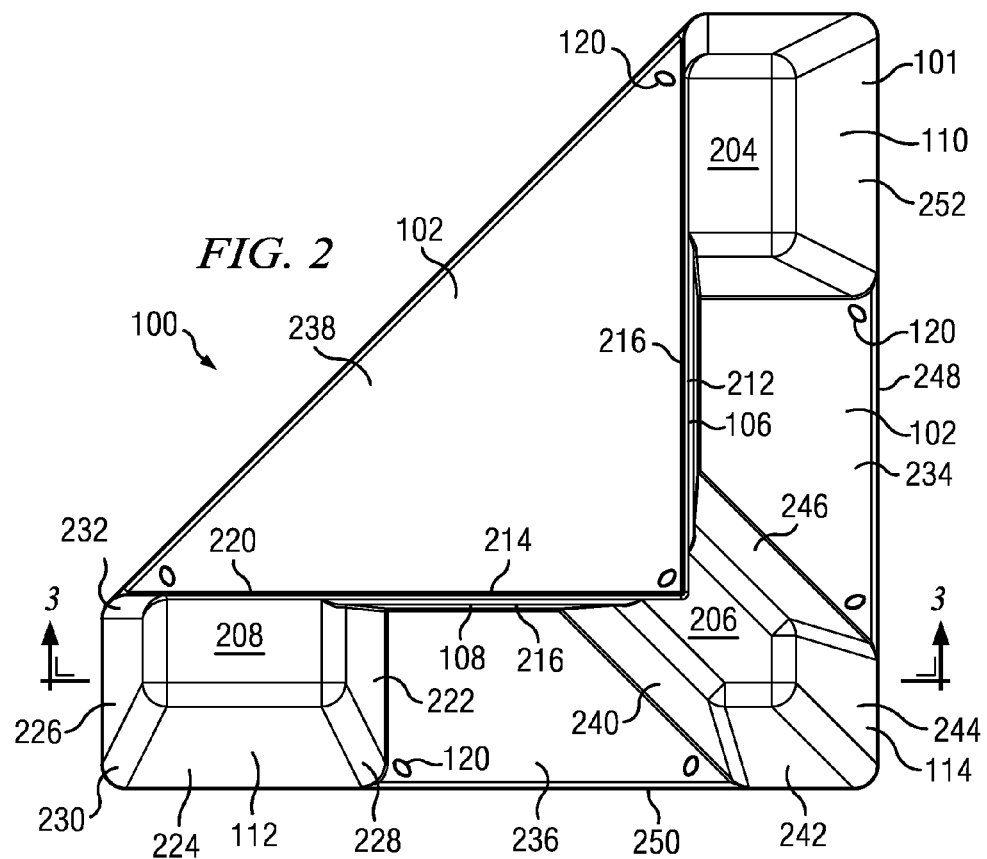
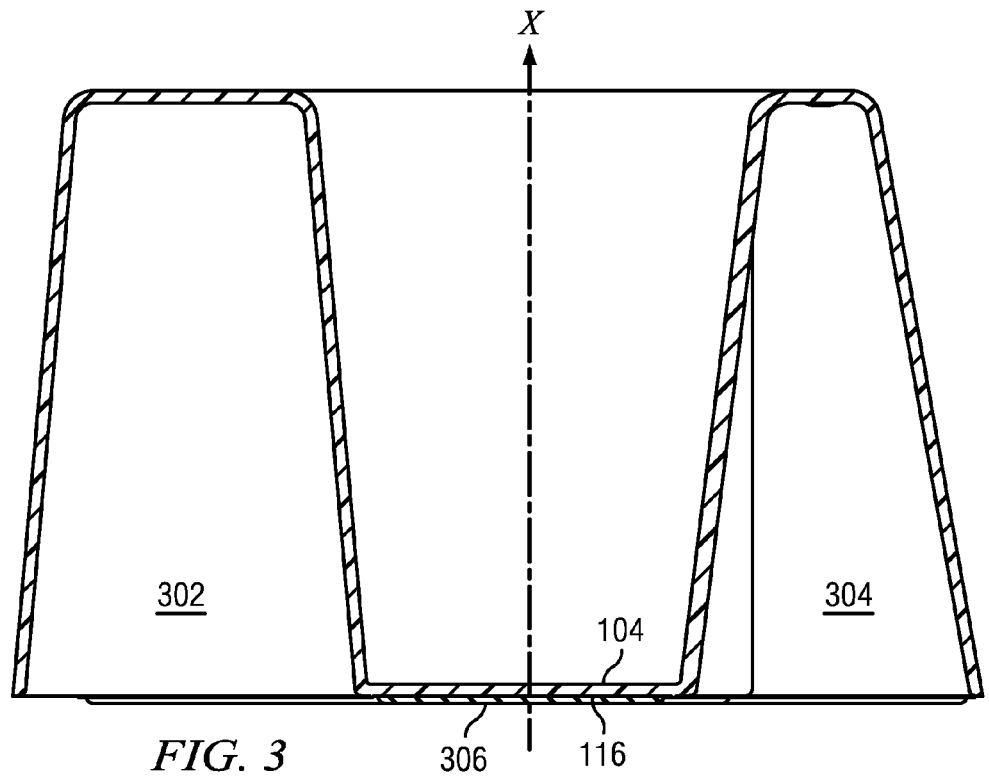

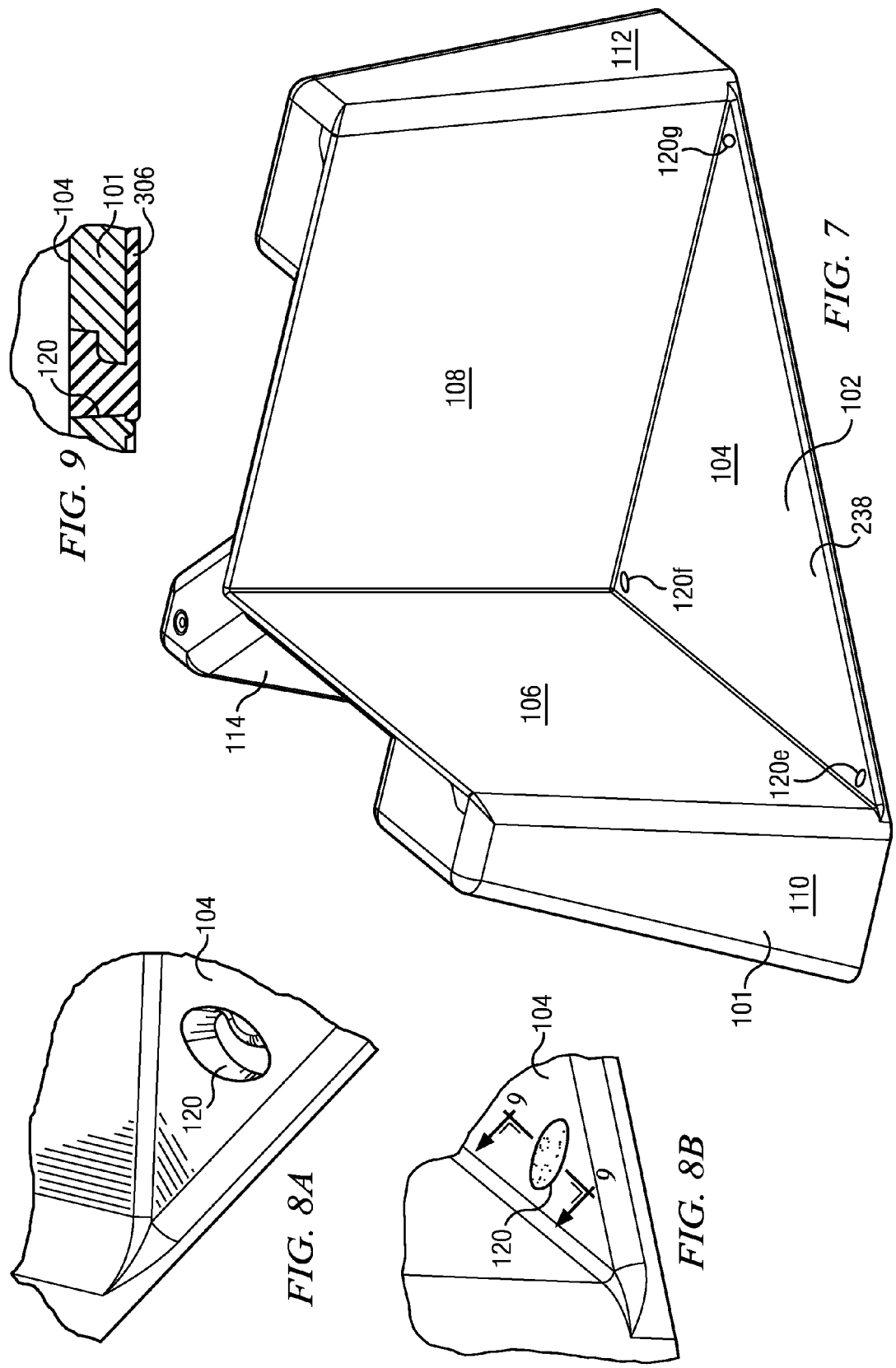

US 9,248,783 B2

STABILIZING CARGO ORGANIZER

BACKGROUND OF THE INVENTION

Vehicles have limited space in which to carry cargo. Most often cargo is situated in trunks, truck beds, and cargo areas. The limited space and the need to optimize the use of that space while transporting multiple items efficiently and safely leads many users to purchase and install various cargo organizers. However, although cargo organizers may inhibit or prevent the cargo from shifting while in transit, most cargo organizers are only partially adjustable allowing the user to have the limited capability of adjusting dividers and pockets rather than the ability to adjust the organizer to fit the varying sizes of the packages or cargo. Cargo organizers on the market cannot be tailored to fit all shapes and sizes of potential cargo—they especially cannot accommodate medium to large cargo or boxes so those items would shift and slide in the vehicle. Furthermore, cargo organizers take up valuable cargo space when not being used.

Thus a need exists for an adjustable cargo stabilizer that can be used to keep large items such as boxes and top heavy items such as packed grocery bags, secure in cargo beds, cargo spaces, or trunks without taking up a lot of space when not in use.

SUMMARY OF THE INVENTION

According to one aspect of the invention, a cargo organizer has an organizer body which is molded from a first polymer. The organizer body has a bottom panel which has an upper surface and lower surface and is disposed substantially at right angles to a vertical axis. Several spaced-apart holes extend from the lower surface of the bottom panel to the upper surface of the bottom panel. A first wall and a second wall are integrally molded with the bottom panel and extend upwardly in parallel to the vertical axis. The first and second walls are disposed at an angle to each other. A friction pad formed of a second polymer is overmolded on the lower surface of the bottom panel. The friction pad extends through the holes on the bottom panel to provide an additional mechanical lock between the friction pad and the organizer body.

According to another aspect of the invention, a cargo organizer has an organizer body molded form a first polymer compound, and has a bottom panel with an upper and lower surface. The bottom panel is disposed at substantially a right angle to a vertical axis. An upstanding first wall is molded with the bottom panel and upwardly extends in parallel to the vertical axis. An upstanding second wall is molded with the bottom panel and upwardly extends in parallel to the vertical axis and at an angle to the first wall. A first pier is integrally molded with and at least partially defines the first wall. The open bottom of the first pier is substantially coplanar with the bottom panel. A second pier which is spaced from the first pier is integrally molded with and at least partially defines the second wall. A friction pad of a second polymer is overmolded on the bottom panel.

According to yet another aspect of the invention, a cargo organizer has an organizer body molded from a first polymer. A bottom panel of the organizer body has a surface area. At least one hollow pier adjoins the bottom panel. The organizer body has a footprint which is equal to the surface area of the bottom panel and the area of the hollow bottom of each of the piers. A friction pad of a second polymer is overmolded on the bottom panel, but is not overmolded on the hollow bottoms of each of the piers.

The present invention provides an advantage over prior cargo organizers because it prevents many different sizes of cargo from shifting. In addition and when not in use, the cargo organizer can be stored and take up minimal space. Furthermore, the friction pad of the cargo organizer will not delaminate.

BRIEF DESCRIPTION OF THE DRAWINGS

Further aspects of the invention and their advantages can be discerned in the following detailed description, in which like characters denote like parts and in which:

FIG. 2 is a plan view of a stabilizing cargo organizer shown in FIG. 1;

FIG. 3 is sectional view taken substantially along line 3-3 of FIG. 2;

FIG. 7 is an isometric view looking into a corner formed by the stabilizing cargo organizer;

FIG. 8A is a detail view, from the top, of a representative through hole of the stabilizing cargo organizer before overmolding;

FIG. 8B is a detail view, from the top, of a representative through hole of the stabilizing cargo organizer after overmolding; and FIG. 9 is a sectional view corresponding to a section along line 9-9 of FIG. 8B.

DETAILED DESCRIPTION

Figure 1:
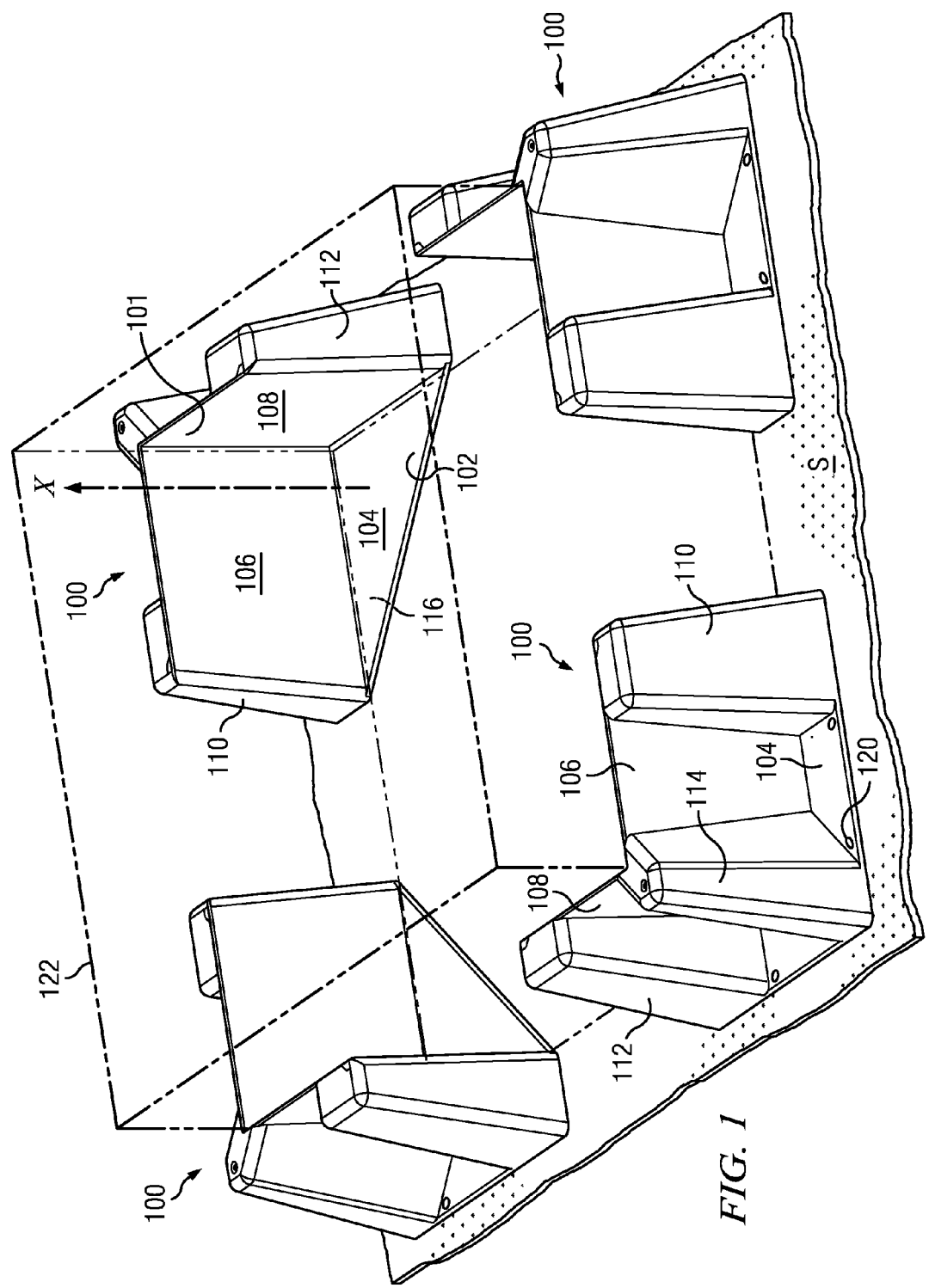
FIG. 1 is an isometric view of four stabilizing cargo organizers according to the invention, as assembled around a box that is shown as environmental structure.

Stabilizing cargo organizers 100 according to the invention can be used to stabilize and organize cargo such as boxes on a surface S which may be a surface in a cargo bed, a cargo space or a trunk of a vehicles. In the exemplary embodiment shown in FIG. 1, four stabilizing cargo organizers 100 are positioned around a box 122. A friction pad 306 (See FIGS. 3 and 5) disposed on the bottom of each cargo organizer 100 prevents movement of the cargo organizers 100 and caged cargo. The heavier the object placed on the cargo organizer 100, the more force required to move the cargo organizer 100. The force required to move the cargo organizer 100 is proportional to the weight of the box 122 or cargo times the area of the friction pad 306 times the coefficient of friction of the friction pad 306.

Referring to FIGS. 2-4, and 6, a body 101 of the organizer 100 is molded from a first polymer compound, preferably a rigid polypropylene but may also be formed from polystyrene, polyethylene, polycarbonate or acrylic. The organizer 100 has a bottom panel 102 with an upper surface 104 and a lower surface 116 and is disposed substantially at a right angle to a vertical axis X. Several through holes 120 extend from the upper surface 104 to the lower surface 116. A first wall 106 is integrally molded with the bottom panel 102 and upwardly extends in parallel to the vertical axis X. A second wall 108 is integrally molded with the bottom panel 102 and upwardly extends in parallel to the vertical axis X. The first and second walls, 106, 108, are disposed at a right angle to each other in the illustrated embodiment. Accordingly, the intersection of the first wall 106, the second wall 108 and the bottom panel 102 forms a corner and a ledge for the box 122 to be placed upon. In the illustrated embodiment, each corner of the box 122 is placed on the upper surface 104 of the bottom panel 102 of one of the four organizers 100. In other embodiments, the first and second walls 106, 108, may be disposed relative to each other at an angle other than ninety degrees. In addition, in other embodiments the first and second walls 106, 108, may not intersect.

The cargo organizer has a first hollow pier 110 which upwardly extends from the bottom panel 102 and is integrally molded with and at least partially defines the first wall 106. A second hollow pier 112, which is spaced apart from the first pier 110, upwardly extends from the bottom panel 102 and is integrally molded with and at least partially defines the second wall 108. As shown in FIG. 2, the first and second piers 110, 112, have similar shapes which is substantially a frusto-conical rectangular shape. For example, in FIG. 2, the second pier 108 has four walls, 220, 222, 224, and 226 and three rounded corners 228, 230, 232. An interior wall 220 at least partially defines the second wall 108. The remaining walls 222, 224, 226 angle inward as the second pier 112 extends from the bottom panel 102 to a top pier panel 208 such that the surface area of the top pier panel 208 is smaller than the surface area of the open pier bottom 302 (See FIG. 3).

FIG. 2 of the illustrated embodiment has a third pier 114, which is spaced apart from both the first 110 and second 112 piers. The third pier 114 upwardly extends from the bottom panel 102. The third pier 114 forms a junction between the first and second walls 106, 108; in this embodiment the junction is ninety degrees. The two interior walls of the third pier 114 are integrally formed with and at least partially define the first 106 and second 108 walls. The remaining walls, 240, 242, 244, 246 angle inward as the wall extends from the bottom panel 102 to a top pier panel 206. While the illustrated embodiment has a first pier 110, second pier 112 and third pier 114, other embodiments may have no piers or one or two piers. In addition, piers 110, 112, 114 may have shapes other than the shape illustrated. For example, potential shapes for piers 110, 112, 114 may include pyramidal, conical, frusto-conical or rectangular prism shapes.

As shown in FIG. 2, the first wall 106 has an interior side 210 and an exterior side 212 opposed to the interior side. Likewise the second wall 108 has an interior side 214 and an exterior side 216 opposed to the interior side 214. In the illustrated embodiment, the bottom panel 102 extends laterally beyond both the interior 210, 214 and exterior 212, 216 sides of the first and second walls 106, 108. In some embodiments the bottom panel may laterally extend beyond both the interior 210, 214 and exterior 212, 216 of only one of the first or second walls 106, 108. In still other embodiments, an outer margin of the bottom panel 248, 250 may be continuous with either the lower end of the outer wall 252 of the first pier 110, the lower end of the outer wall 224 of the second pier 112 or both.

FIG. 3 shows a cross section of the organizer 100 where the hollow third pier 114 and hollow second pier 112 are visible. A hollow bottom 304 of the third pier 114 and a hollow bottom 302 of the second pier 112 are coplanar with the lower surface 116 of the bottom panel 102. The first pier 110 has a hollow bottom that is also coplanar with the lower surface 116 of the bottom panel 102. A friction pad 306 formed of a second polymer compound which, as molded, has a higher coefficient of friction, relative to surface S, than the first polymer compound, is overmolded on the lower surface 116 of the bottom panel 102 but is not overmolded over the hollow bottoms of the first, second, or third piers 110, 112, 114. As noted above, when a heavy object is placed on the cargo organizer 100, the area of the friction pad 306 and the coefficient of friction of the friction pad 306 combined with the weight of the cargo, make the cargo organizer 100 more resistant to movement. The heavier the object placed on the cargo organizer 100, the greater the resistance to movement. The friction pad 306 is molded to extend into the through holes 120 and is preferably formed of a thermoplastic elastomer (TPE) but may also be formed from any material which has a high coefficient of friction relative to surface S. The material of friction pad 306 preferably is selected to grip a surface S made out of a TPE or a rubber, such as the upper surface of a cargo liner.

Figure 4:
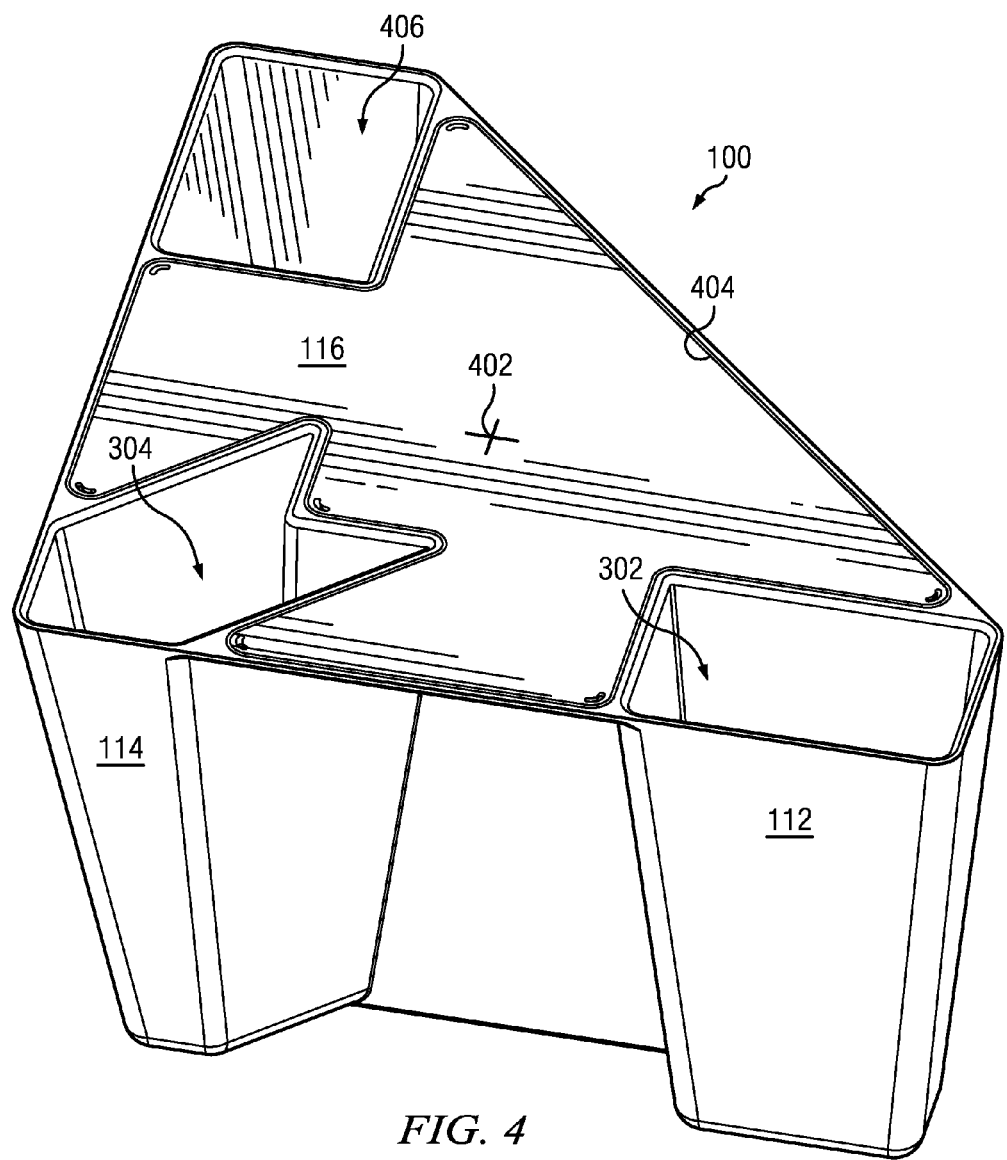
FIG. 4 is an isometric view of the bottom of the stabilizing cargo organizer shown in FIG. 1, illustrating the cargo organizer prior to overmolding with a second polymer compound.

FIG. 4 shows the lower surface 116 of the bottom panel 102 before the friction pad 306 is overmolded. More than one through hole 120 are disposed along the perimeter of the bottom panel 102. The through holes 120 preferably are spaced remotely from a central fill point or gate 402. Since they are close to an end-of-fill limit of the second polymer compound, which will spread outward from gate location 402 radially to holes 120, the holes 120 permit gas trapped in the overmold process to escape to the upper surface 104 of the bottom panel 102 and dissipate into the air. The shape of the through holes 120 changes from a crescent on the lower surface 116 of the bottom panel 102 to an oval on the upper surface 104 of the bottom panel 102 (See FIGS. 1 and 2), expanding in area as one proceeds upwardly. Therefore, in addition to venting gas, the through holes 120 help form a mechanical lock or attachment of the overmolded friction pad 306 to the lower surface 116 of the bottom panel 102.

A crush bead 404 is disposed on the lower surface 116 of the bottom panel 102 near its lateral boundary. The crush bead 404 is a smooth endless horizontal surface that downwardly depends from the lower surface 116 of the bottom panel 102. The crush bead 404 is used as a shut off surface to prevent the flashing of the second polymer compound during a "second shot" or overmolding step of fabrication.

Figure 5:
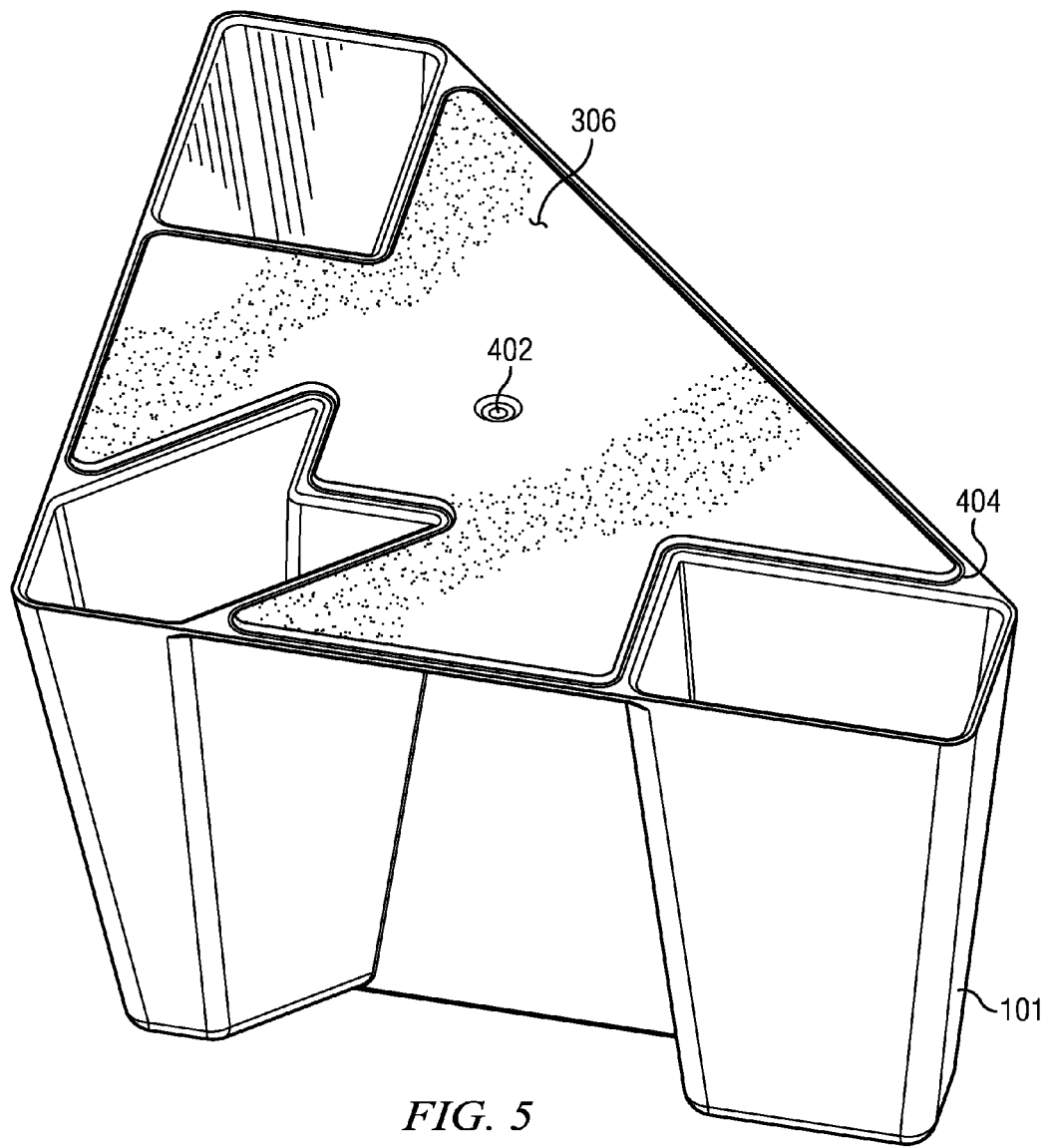
FIG. 5 is an isometric view of the bottom of the same stabilizing cargo organizer shown in FIG. 4, shown after overmolding is complete.

FIG. 5 shows the lower surface 116 of the bottom panel 102 after the overmolding process has occurred. Here, the friction pad 306 has been overmolded onto the lower surface 116 of the bottom panel 102 within the perimeter of the crush bead 404.

Figure 6:
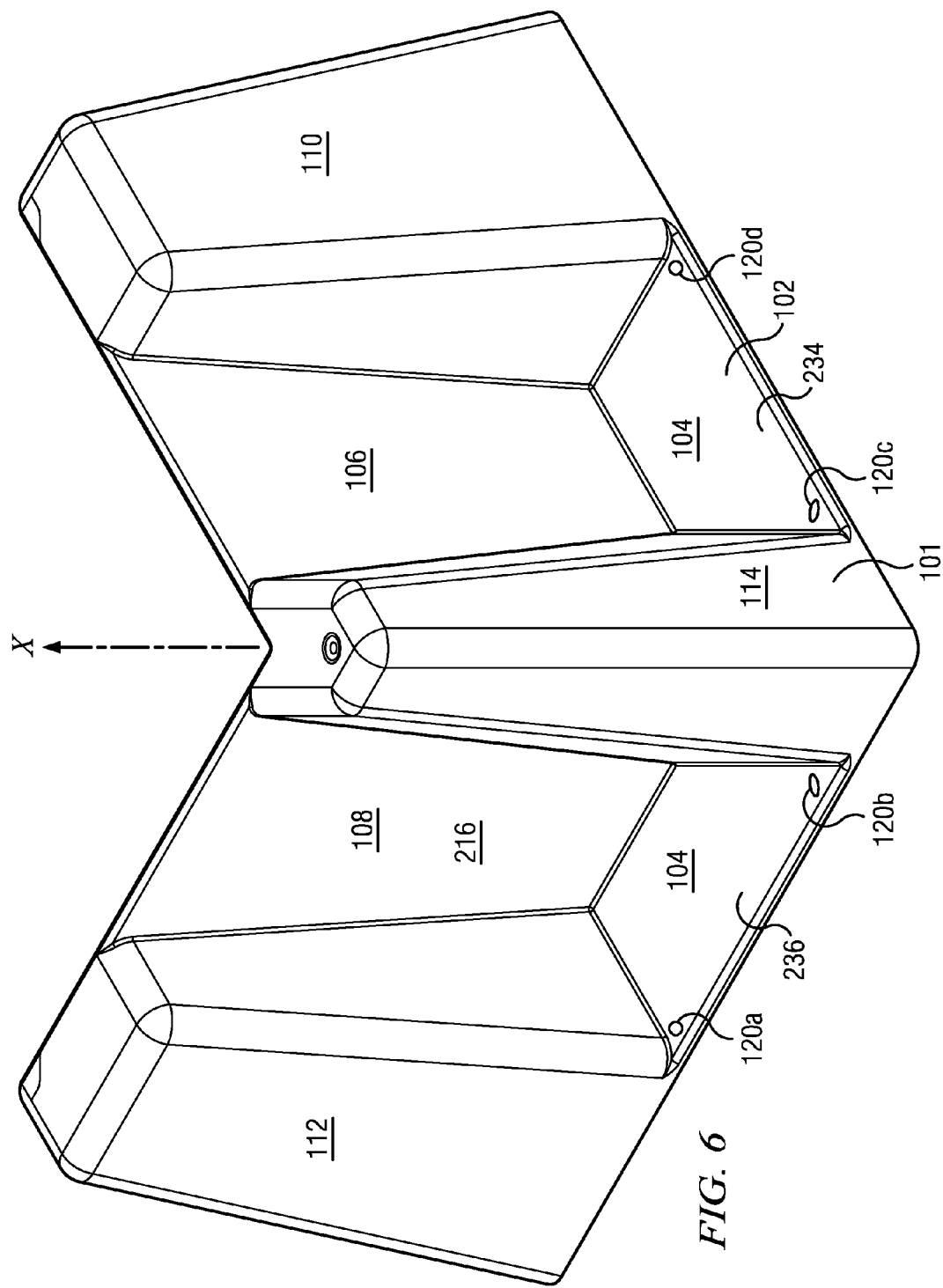
FIG. 6 is an outer isometric view of a corner of the stabilizing cargo organizer.

FIGS. 6 and 7 show different views of the organizer 100 after the friction pad 306 is overmolded onto body 101. The second polymer of the friction pad 306 is visible in the through holes 120 with the top of the polymer in the through hole 120 being coplanar with the upper surface 104 of the bottom panel 102. In the illustrated embodiment two through holes, 120c, 120d, are between the first and third piers 110, 114 and the exterior 212 of the first wall 106, on outer trapezoidal shelf 234, near the lateral outer periphery of bottom panel 102. Through hole 120c is near the outer periphery of pier 114 and hole 120d is near the outer periphery of pier 110. There are two through holes 120a, 120b, between the second and third piers 112, 114, and the exterior 216 of the second wall 108 on outer trapezoidal shelf 236, near the lateral outer periphery of bottom panel 102. Through hole 120a is near the outer periphery of pier 112 and hole 120b is near the outer periphery of pier 114. In addition, as shown on FIG. 7, through hole 120e is disposed on the upper surface 104 of the bottom panel 102, on the inner triangular shelf 238 near the outer periphery of panel 102 and wall 106. Through hole 120f is disposed on the upper surface 104 of the bottom panel 102, on the inner triangular shelf 238, near the junction of walls 106 and 108. Through hole 120g is disposed on the upper surface 104 of the bottom panel 102, on the inner triangular shelf 238, near the outer periphery of panel 102 and wall 108. Other embodiments may have more or fewer through holes 120 which may be disposed in different locations.

As shown in FIGS. 4, 8A and 9 and discussed above, the through holes 120 on the lower surface 116 of the bottom panel 102 have a crescent shape. However, the through holes 120 on the upper surface 104 of the bottom panel 102 have an oval shape. FIG. 8A shows the transition of the through hole 120 from oval on the upper surface 104 of the bottom panel 102 to the crescent shape on the lower surface 116 of the bottom panel 102. (See FIG. 4) FIG. 8B shows the through hole 120 filled with the friction pad material 306. FIG. 9 shows that the through holes transition from the crescent on the lower surface 116 of the bottom panel 102 to the oval on the upper surface 104 of the bottom panel 102. The changing shape and expanding area of the through hole 120 as a function of distance from the lower surface allows for an additional mechanical lock of the friction pad 306 to the bottom panel 102. Other embodiments may have through holes with different shapes with the surface area of the through hole 120 on the upper surface 104 of the bottom panel 102 being larger than the surface area of the through hole 120 on the lower surface 116 of the bottom panel 102.

In the exemplar embodiment shown in FIGS. 2, 6-7, the distance between the third pier 114 and the outermost edge of the first pier 110 is approximately eight inches. Likewise, the distance between the center of third pier 114 and the outermost edge of the second pier 112 is approximately eight inches. The height of the first, second and third piers, 110, 112, 114, is approximately five inches. In FIG. 3, the friction pad 306 extends approximately 0.060 inch from the lower surface 116 of the bottom panel 102.

In summary, a cargo organizer has been shown and described which can be used for many different sized packages and boxes and which have a friction pad to prevent cargo from moving while being transported in a vehicle. While illustrated embodiments of the present invention have been described and illustrated in the appended drawings, the present invention is not limited thereto but only by the scope and spirit of the appended claims.

We claim:

1. A cargo organizer for stabilizing cargo in a vehicle, the cargo organizer comprising:
   an organizer body molded from a first polymer compound, the organizer body having a bottom panel with an upper surface and a lower surface, the bottom panel disposed substantially at right angles to a vertical axis, a plurality of spaced-apart holes extending from the upper surface to the lower surface;
   an upstanding first wall integrally molded with the bottom panel and upwardly extending in parallel to the vertical axis;
   an upstanding second wall integrally molded with the bottom panel and upwardly extending in parallel to the vertical axis, the second wall disposed at an angle to the first wall; and
   a friction pad formed of a second polymer compound having a higher coefficient of friction than the first polymer compound, the friction pad overmolded on the lower surface of the bottom panel and extending through said holes on the bottom panel so as to provide a mechanical lock of the friction pad to the organizer body.

2. The cargo organizer of claim 1, wherein the first wall is disposed at a right angle to the second wall.

3. The cargo organizer of claim 1, wherein the first wall is joined to the second wall to form a three-sided corner with the upper surface of the bottom panel.

4. The cargo organizer of claim 1, wherein each of the plurality of holes has a top surface area at the upper surface of the bottom panel and a bottom surface area at the lower surface of the bottom panel, the bottom surface area being less than the top surface area.

5. The cargo organizer of claim 1, wherein each of the first and second walls have an interior side and an exterior side opposed to the interior side, the bottom panel laterally extending beyond both of the interior and exterior sides of at least one of the first and second walls.

6. The cargo organizer of claim 5, wherein the bottom panel laterally extends beyond both of the interior and exterior sides of both the first and second walls.

7. The cargo organizer of claim 5, wherein at least one of the plurality of holes is disposed near the interior side of the first wall and remote from the exterior side of the first wall, at least one of the plurality of holes is disposed near the exterior side of the first wall and remote from the interior side of the first wall, at least one of the plurality of holes is disposed near the interior side of the second wall and remote from the exterior side of the second wall, and at least one of the plurality of holes is disposed near the exterior side of the second wall and remote from the interior side of the second wall.

8. The cargo organizer of claim 1, wherein a hollow first pier extends upwardly from the upper surface of the bottom panel.

9. The cargo organizer of claim 8, wherein a hollow second pier extends upwardly from the upper surface of the bottom panel.

10. The cargo organizer of claim 9, wherein a hollow third pier extends upwardly from the upper surface of the bottom panel.

11. A cargo organizer for stabilizing cargo in a vehicle, the cargo organizer comprising:
   an organizer body molded from a first polymer compound, the organizer body having a bottom panel with an upper surface and a lower surface, the bottom panel disposed substantially at a right angle to a vertical axis;
   an upstanding first wall integrally molded with the bottom panel and upwardly extending in parallel to the vertical axis;
   an upstanding second wall integrally molded with the bottom panel and upwardly extending in parallel to the vertical axis and at an angle to the first wall;
   an upwardly extending, hollow first pier integrally molded with and at least partially defining the first wall, an open bottom of the first pier being substantially coplanar with the bottom panel;
   an upwardly extending, hollow second pier integrally molded with and at least partially defining the second wall, an open bottom of the second pier being substantially coplanar with the bottom panel, the second pier being spaced from the first pier; and
   a friction pad overmolded on the bottom panel to be coextensive with the lower surface of the bottom panel, the friction pad formed from a second polymer compound having a higher coefficient of friction than the first polymer compound, the friction pad not extending to cover the open bottoms of the first and second piers;
   wherein each of the first and second walls have an interior side and an exterior side opposed to the interior side, the bottom panel laterally extending beyond both the interior and exterior sides of the first and second walls, the first pier having at least one outer wall spaced from the first wall, the second pier having at least one outer wall spaced from the second wall, the first pier outer walls terminating at the open bottom of the first pier, the second pier outer wall terminating at the open bottom of the second pier.

12. The cargo organizer of claim 11, wherein the outer walls of the first and second piers are sloped.

13. A cargo organizer for stabilizing cargo in a vehicle, the cargo organizer comprising:
an organizer body molded from a first polymer compound, the organizer body having a bottom panel with an upper surface and a lower surface, the bottom panel disposed substantially at a right angle to a vertical axis;
an upstanding first wall integrally molded with the bottom panel and upwardly extending in parallel to the vertical axis;
an upstanding second wall integrally molded with the bottom panel and upwardly extending in parallel to the vertical axis and at an angle to the first wall;
an upwardly extending, hollow first pier integrally molded with and at least partially defining the first wall, an open bottom of the first pier being substantially coplanar with the bottom panel;
an upwardly extending, hollow second pier integrally molded with and at least partially defining the second wall, an open bottom of the second pier being substantially coplanar with the bottom panel, the second pier being spaced from the first pier; and
a friction pad overmolded on the bottom panel to be coextensive with the lower surface of the bottom panel, the friction pad formed from a second polymer compound having a higher coefficient of friction than the first polymer compound, the friction pad not extending to cover the open bottoms of the first and second piers;
further comprising an upwardly extending, hollow third pier integrally molded with and at least partially defining the first and second walls, an open bottom of the third pier being substantially coplanar with the bottom panel, the third pier being spaced from the first and second piers.

14. The cargo organizer of claim 13, wherein the third pier forms a junction between the first and second walls.

15. The cargo organizer of claim 13, wherein the third pier having at least one outer wall spaced from the first and second walls, the at least one outer wall of the third pier being sloped.

16. A cargo organizer for stabilizing cargo in a vehicle, the cargo organizer comprising:
an organizer body molded from a first polymer compound, the organizer body having a bottom panel with an upper surface and a lower surface, the bottom panel disposed substantially at a right angle to a vertical axis;
an upstanding first wall integrally molded with the bottom panel and upwardly extending in parallel to the vertical axis;
an upstanding second wall integrally molded with the bottom panel and upwardly extending in parallel to the vertical axis and at an angle to the first wall;
an upwardly extending, hollow first pier integrally molded with and at least partially defining the first wall, an open bottom of the first pier being substantially coplanar with the bottom panel;
an upwardly extending, hollow second pier integrally molded with and at least partially defining the second wall, an open bottom of the second pier being substantially coplanar with the bottom panel, the second pier being spaced from the first pier; and
a friction pad overmolded on the bottom panel to be coextensive with the lower surface of the bottom panel, the friction pad formed from a second polymer compound having a higher coefficient of friction than the first polymer compound, the friction pad not extending to cover the open bottoms of the first and second piers;
wherein a plurality of holes extend from the upper surface to the lower surface of the bottom panel, the friction pad molded to extend into the holes.

17. A cargo organizer for stabilizing cargo in a vehicle, the cargo organizer comprising:
an organizer body molded from a first polymer compound, the organizer body having a bottom panel with an upper surface and a lower surface, the bottom panel disposed substantially at a right angle to a vertical axis;
an upstanding first wall integrally molded with the bottom panel and upwardly extending in parallel to the vertical axis;
an upstanding second wall integrally molded with the bottom panel and upwardly extending in parallel to the vertical axis and at an angle to the first wall;
an upwardly extending, hollow first pier integrally molded with and at least partially defining the first wall, an open bottom of the first pier being substantially coplanar with the bottom panel;
an upwardly extending, hollow second pier integrally molded with and at least partially defining the second wall, an open bottom of the second pier being substantially coplanar with the bottom panel, the second pier being spaced from the first pier; and
a friction pad overmolded on the bottom panel to be coextensive with the lower surface of the bottom panel, the friction pad formed from a second polymer compound having a higher coefficient of friction than the first polymer compound, the friction pad not extending to cover the open bottoms of the first and second piers;
wherein the first pier has a first pier outer wall with a lower end, the first pier outer wall having a lower end, the second pier having a second pier outer wall, the bottom panel having an outer margin, the outer margin being continuous with at least one of the first pier outer wall lower end and the second pier outer wall lower end.

18. The cargo organizer of claim 17, wherein the outer margin of the bottom panel is continuous with the lower ends of both of the first pier outer wall and second pier outer wall.

* * * * *